United States Patent
Omori et al.

(10) Patent No.: US 12,215,644 B2
(45) Date of Patent: Feb. 4, 2025

(54) VEHICLE CONTROL METHOD, AND VEHICLE CONTROL DEVICE

(71) Applicant: NISSAN MOTOR CO., LTD., Yokohama (JP)

(72) Inventors: Masahiro Omori, Kanagawa (JP); Kazuki Hirasako, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 0 days.

(21) Appl. No.: 18/566,575

(22) PCT Filed: Jun. 3, 2021

(86) PCT No.: PCT/JP2021/021142
§ 371 (c)(1),
(2) Date: Dec. 1, 2023

(87) PCT Pub. No.: WO2022/254646
PCT Pub. Date: Dec. 8, 2022

(65) Prior Publication Data
US 2024/0254937 A1    Aug. 1, 2024

(51) Int. Cl.
*F02D 41/02* (2006.01)
*F02D 41/12* (2006.01)

(52) U.S. Cl.
CPC ......... *F02D 41/022* (2013.01); *F02D 41/123* (2013.01); *F02D 2200/50* (2013.01); *F02D 2200/501* (2013.01); *F02D 2200/602* (2013.01)

(58) Field of Classification Search
CPC .. F02D 41/022; F02D 41/123; F02D 2200/50; F02D 2200/501; F02D 2200/602
See application file for complete search history.

(56) References Cited

U.S. PATENT DOCUMENTS

2014/0257652 A1    9/2014    Oki et al.
2014/0373809 A1    12/2014    Kawamoto et al.

FOREIGN PATENT DOCUMENTS

JP    2012-047312 A    3/2012
JP    2013-060898 A    4/2013
(Continued)

OTHER PUBLICATIONS

Machine Translation of RU2719102C2 PDF File Name: "RU2719102C2_Machine_Translation.pdf".*

*Primary Examiner* — Grant Moubry
*Assistant Examiner* — Ruben Picon-Feliciano
(74) *Attorney, Agent, or Firm* — Foley & Lardner LLP (57) ABSTRACT

An engine controller inhibits a fuel cut when it is predicted that a lockup clutch is released after elapse of a predetermined period of time, at the time of the starting of the fuel cut. Specifically, engine controller is configured to predict (calculate) the vehicle speed after a predetermined period of time, and inhibit the fuel cut when the predicted (calculated) vehicle speed after the predetermined period of time is equal to or less than a lockup release speed. With this, it is possible to avoid a situation in which an internal combustion engine restarts fuel supply immediately after the fuel supply has been cut. Consequently, in the vehicle, the occurrence of the torque fluctuation of internal combustion engine resulting from fuel cut recovery can be suppressed, a change in acceleration in the front-rear direction of the vehicle is suppressed, and a deterioration in driving performance can be suppressed.

5 Claims, 5 Drawing Sheets

(56) References Cited

FOREIGN PATENT DOCUMENTS

| JP | 2014-173511 A | 9/2014 | | |
|---|---|---|---|---|
| RU | 2719102 C2 | * | 4/2020 | ............ B60K 6/547 |

* cited by examiner

VEHICLE CONTROL METHOD, AND VEHICLE CONTROL DEVICE

TECHNICAL FIELD

The present invention relates to a vehicle control method, and to a vehicle control device.

BACKGROUND TECHNOLOGY

For example, in a patent document 1, there is disclosed a technique in which a fuel cut for stopping fuel supply to an internal combustion engine is carried out when the engine rotation speed of the internal combustion engine exceeds a previously set predetermined rotation speed in a state in which a lockup clutch of a torque converter is engaged and during traveling in a state in which an accelerator pedal is released, and the fuel cut is inhibited when the engine rotation speed of the internal combustion engine is equal to or lower than the predetermined rotation speed in order to avoid engine stall and the like.

However, in the patent document 1, a situation in case where, for example, the rapid deceleration of a vehicle immediately after the start of the fuel cut is performed is not considered. That is, in the patent document 1, if a situation in which fuel supply to the internal combustion engine restarts immediately after the start of the fuel cut occurs, torque fluctuation in which the torque of the internal combustion engine in a decreasing state by the stopping of fuel injection turns to increase occurs, and driving performance might deteriorate.

PRIOR ART REFERENCE

Patent Document

Patent Document 1: Japanese Patent Application Publication No. 2013-60898

SUMMARY OF THE INVENTION

In a vehicle of the present invention, when a lockup clutch of a torque converter is released during a fuel cut for stopping fuel supply to an internal combustion engine, the fuel supply to the internal combustion engine restarts. Then, in the vehicle of the present invention, when the fuel cut starts, if it is predicted that the lockup clutch is released after elapse of a predetermined period of time, the fuel cut is inhibited.

In the vehicle of the present invention, torque fluctuation (driving force fluctuation) of the internal combustion engine resulting from fuel cut recovery can be suppressed, a change in acceleration in the front-rear direction of the vehicle is suppressed, and a deterioration in driving performance can be suppressed.

MODE FOR IMPLEMENTING THE INVENTION

In the following, one embodiment of the present invention will be explained in detail based on the drawings.

Figure 1:
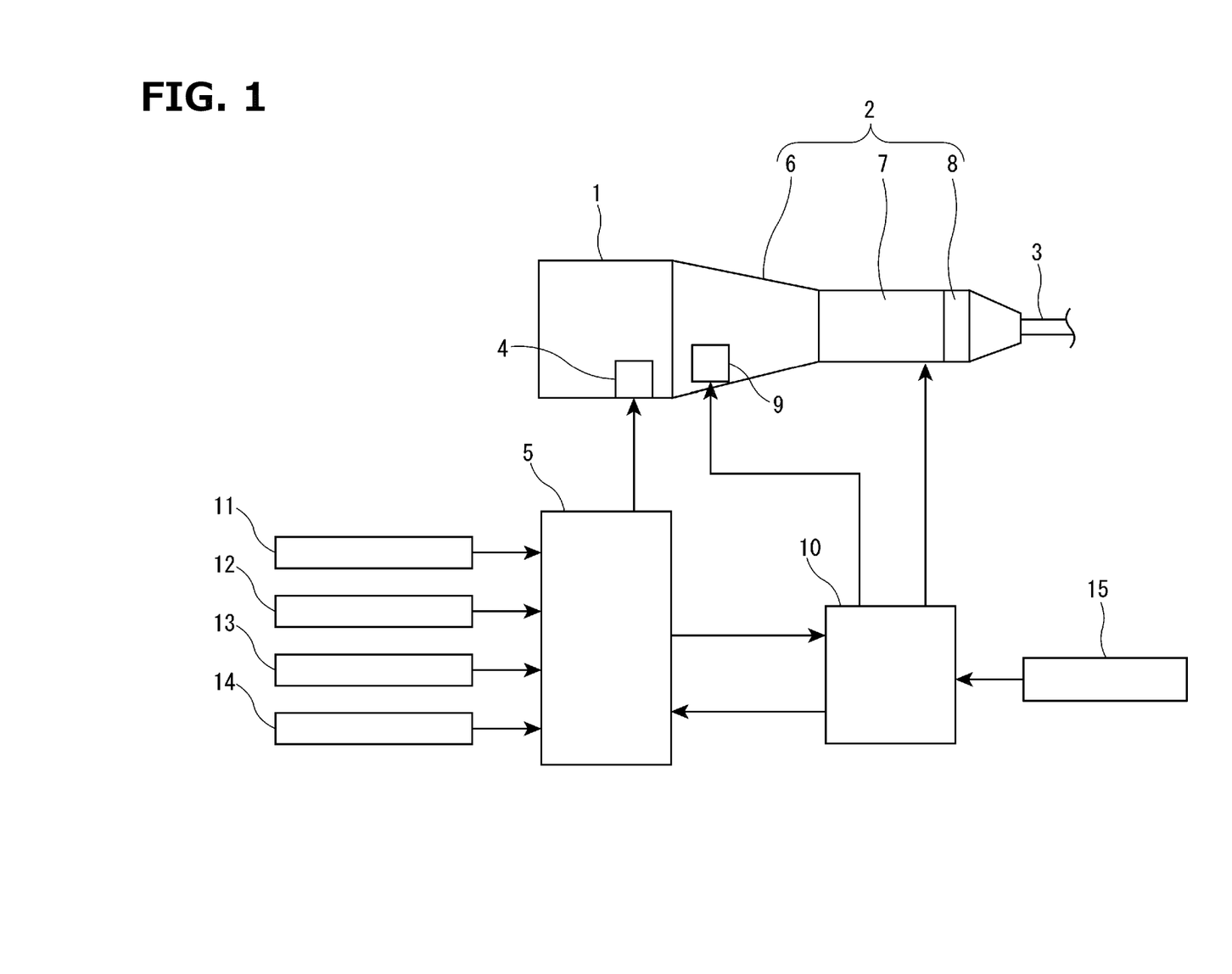
FIG. 1 is an illustrative view schematically showing a configuration of a power train of a vehicle to which the present invention has been applied.

FIG. 1 is an illustrative view schematically showing a configuration of a power train of a vehicle, such as an automobile, to which the present invention has been applied.

An internal combustion engine 1 transmits driving force (rotation torque) to an output shaft 3 via a speed change unit 2.

Internal combustion engine 1 is, for example, a spark ignition type multiple cylinder internal combustion engine, and is provided with a fuel injection valve 4 to each cylinder.

Various control of the fuel injection control of fuel injection valve 4 and internal combustion engine 1 is carried out by an engine controller 5 (ECU). Engine controller 5 corresponds to a fuel supply control unit.

Speed change unit 2 includes a torque converter 6 to which a rotation shaft (crankshaft) of internal combustion engine 1, which is not shown, is connected, a continuously variable transmission (CVT) 7 as an automatic transmission for changing the speed of the output rotation of torque converter 6, and an auxiliary transmission 8 for changing the speed of the output rotation of continuously variable transmission 7. Since speed change unit 2 includes auxiliary transmission 8 in addition to continuously variable transmission 7, the total gear ratio can be set widely.

Torque converter 6 includes a pump impeller (not shown) connected to the rotation shaft of internal combustion engine 1, a turbine runner (not shown) connected to the input shaft of continuously variable transmission 7, and a lockup clutch 9 which is capable of connecting the pump impeller with the turbine runner.

Torque converter 6 transmits torque via hydraulic oil between the pump impeller and the turbine runner. Lockup clutch 9 directly connects the pump impeller with the turbine runner at the time of engagement and allows the relative rotation of the pump impeller and the turbine runner at the time of release.

That is, torque converter 6, continuously variable transmission 7 and auxiliary transmission 8 are provided on the path for transmitting the rotation of internal combustion engine 1 to a drive wheel. Internal combustion engine 1 is a driving source for a drive wheel of the vehicle.

The engagement and release of lockup clutch 9 are carried out by a transmission controller (TCU) 10.

Continuously variable transmission 7 is, for example, a belt-type stepless transmission, and the speed change ratio is continuously controlled mainly based on an accelerator opening degree and a vehicle speed by transmission controller 10.

Auxiliary transmission 8 is, for example, a planetary gear type automatic transmission having a forward two-stage speed change function, and the speed change stage is controlled mainly based on an accelerator opening degree and a vehicle speed by transmission controller 10.

Engine controller 5 and transmission controller 10 each are a well-known digital computer provided with a CPU, a ROM, a RAM and an input/output interface. Engine controller 5 and transmission controller 10 are connected to each other via a CAN communication line which is capable of exchanging information.

Detection signals of various sensors such as a vehicle speed sensor 11 for detecting the vehicle speed of a vehicle, a crank angle sensor 12 for detecting the crank angle of a crankshaft, an accelerator opening sensor 13 as an accelerator opening degree detection part for detecting the stepping amount of an accelerator pedal, and an accelerator sensor 14 for detecting the acceleration of the vehicle are input to engine controller 5.

When the accelerator opening degree becomes zero (accelerator is turned off) during traveling of the vehicle, engine controller 5 carries out a fuel cut for stopping fuel supply to internal combustion engine 1 under a predetermined condition. That is, in internal combustion engine 1, the fuel cut becomes possible when a predetermined fuel cut permission condition is established. The fuel cut is stopped when the engine rotation speed decreases to a predetermined recovery rotation speed or less. The stopping of the fuel cut is to restart the fuel supply (fuel cut recovery).

The recovery rotation speed is an engine rotation speed of internal combustion engine 1 which is a standard of the fuel cut and the fuel cut recovery. Engine controller 5 carries out the fuel cut when the accelerator opening degree is zero and the engine rotation speed exceeds the recovery rotation speed. In addition, engine controller 5 carries out the fuel cut recovery when the engine rotation speed becomes lower than the predetermined recovery rotation speed during the fuel cut or lockup clutch 9 is released during the fuel cut.

Detection signals from a shift sensor 15 for detecting an operation position of the shift lever, and the like are input to transmission controller 10.

Transmission controller 10 outputs a signal for instructing the release of lockup clutch 9 in accordance with a driving condition such as a traveling speed of the vehicle, when the accelerator pedal is released during traveling in a state of the engagement of lockup clutch 9.

For example, transmission controller 10 outputs a command for releasing lockup clutch 9 when a vehicle speed becomes a previously set predetermined lockup release speed or less. The lockup release speed is a threshold of the vehicle speed for releasing lockup clutch 9.

Figure 2:
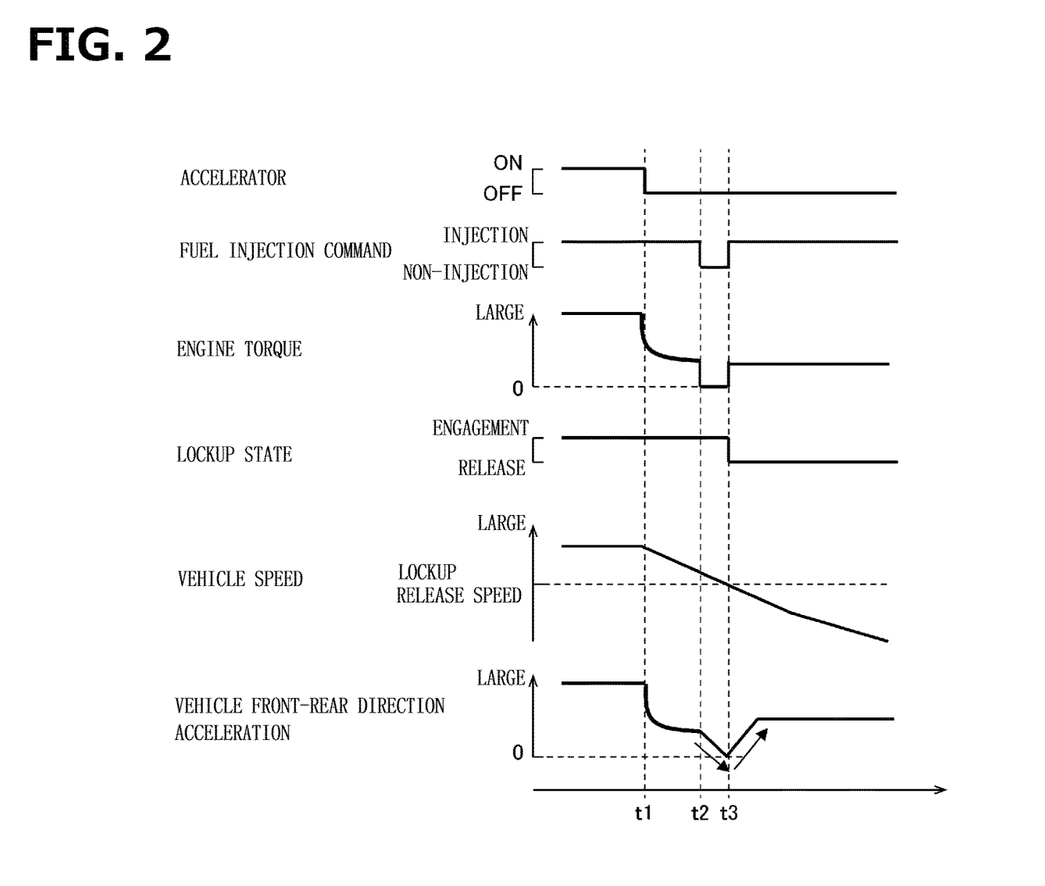
FIG. 2 is a timing chart showing changes in various parameters before and after fuel cut recovery in a comparative embodiment.

Here, when lockup clutch 9 is released immediately after the fuel cut is carried out, as shown in FIG. 2, torque fluctuation in which the torque of internal combustion engine 1 during decreasing by the stopping of fuel injection turns to increase occurs, and driving performance might deteriorate. FIG. 2 is a timing chart showing changes in various parameters before and after the fuel cut recovery in a comparative embodiment.

A time t1 in FIG. 2 is a timing at which the accelerator is turned off and the stepping amount of the accelerator pedal becomes "0". A time t2 in FIG. 2 is a timing at which the fuel cut starts. A time t3 in FIG. 2 is a timing at which the vehicle speed becomes a lockup release speed or less.

In case where the fuel cut is carried out during the engagement of lockup clutch 9, when the vehicle speed decreases to the lockup release speed immediately after the fuel cut, the fuel cut recovery is carried out with the release of lockup clutch 9. Consequently, the acceleration in the front-rear direction of the vehicle turns to increase by the fuel cut recovery during the decreasing of the acceleration by the fuel cut. That is, a shock feeling of torque fluctuation felt by a driver becomes worse due to the turning of the acceleration in the front-rear direction of the vehicle to increase during the decreasing.

Therefore, at the time of start of the fuel cut, engine controller 5 inhibits the fuel cut when it is predicted that lockup clutch 9 is released after elapse of a predetermined period of time. Specifically, engine controller 5 predicts (calculates) the vehicle speed after a predetermined period of time, and inhibits the fuel cut when the predicted (calculated) vehicle speed after the predetermined period of time is equal to or less than the lockup release speed.

Figure 3:
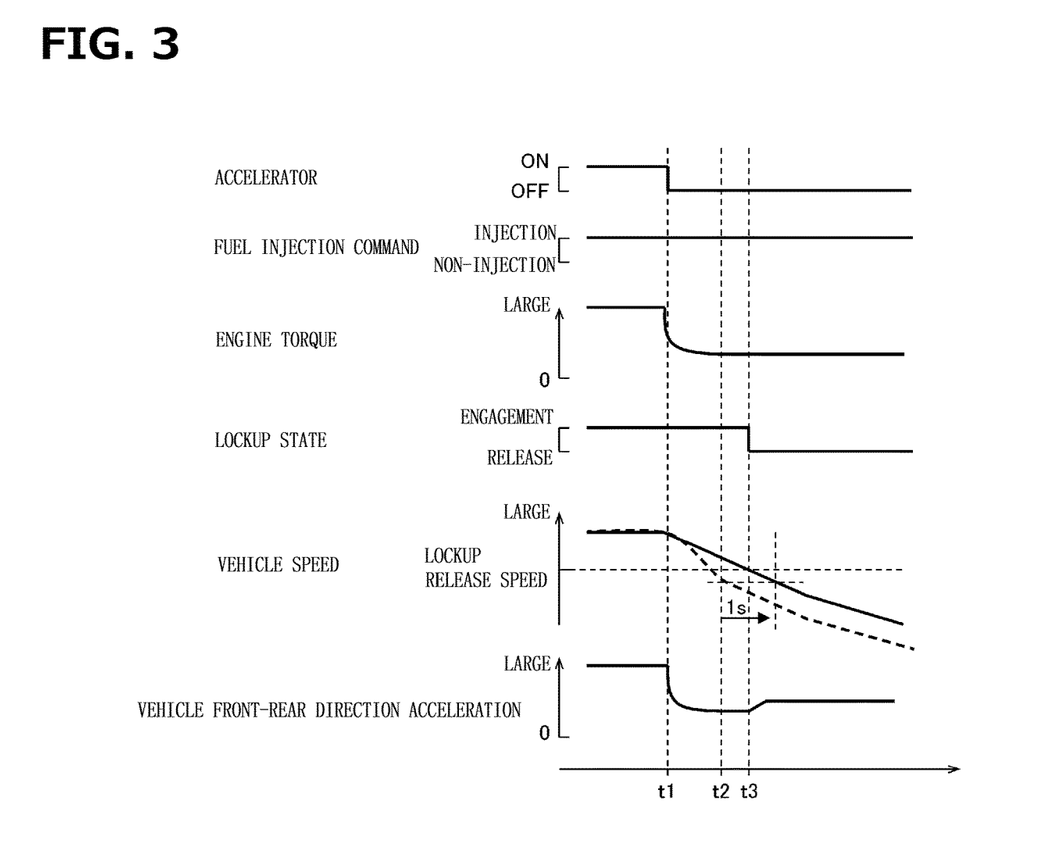
FIG. 3 is a timing chart showing one example of changes in various parameters before and after fuel cut recovery of a vehicle to which the present invention has been applied.
Figure 4:
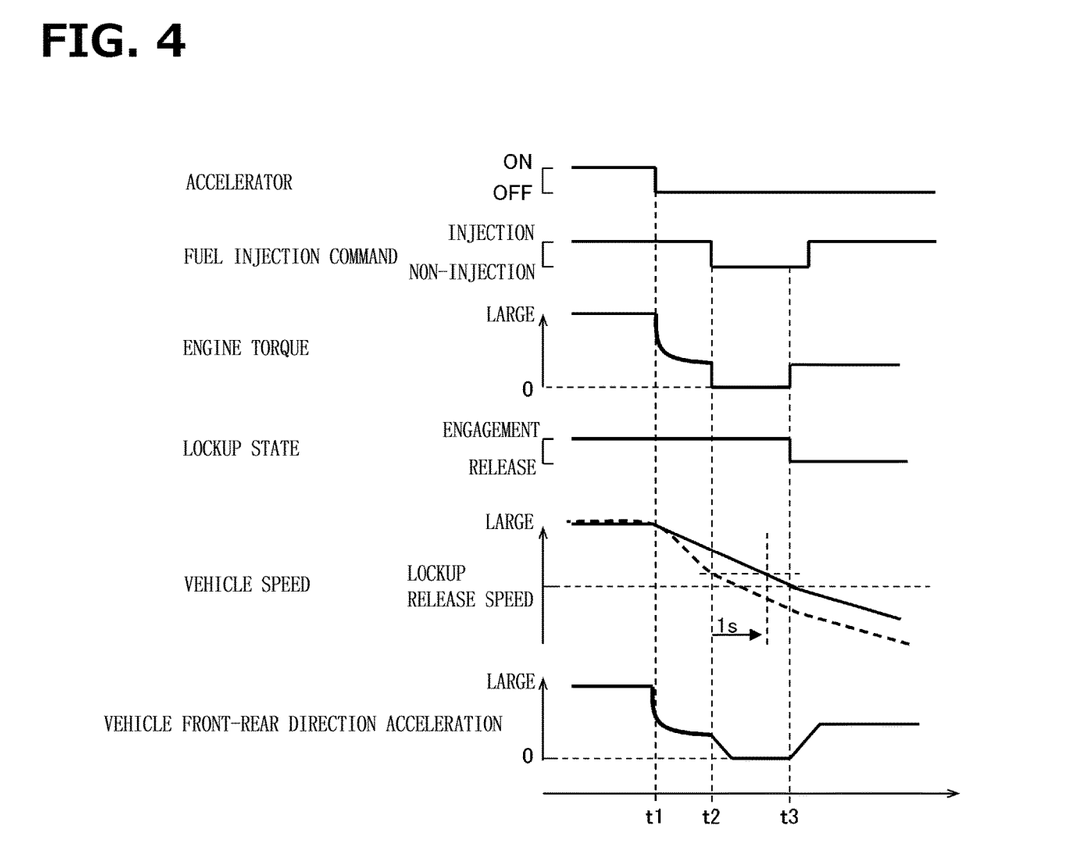
FIG. 4 is a timing chart showing one example of changes in various parameters before and after fuel cut recovery of a vehicle to which the present invention has been applied.

FIGS. 3 and 4 each are a timing chart showing one example of changes in various parameters before and after the fuel cut recovery in the above-mentioned embodiment. The vehicle speed shown by a broken line in each of FIGS. 3 and 4 is a prediction value of the vehicle speed after a predetermined period of time from that point (for example, after 1 second). A time t1 in each of FIGS. 3 and 4 is a timing in which the accelerator is turned off and the stepping amount of the accelerator pedal becomes "0". A time t2 in each of FIGS. 3 and 4 is a timing at which a fuel cut permission condition is established. In addition, the time t2 of FIG. 3 is also a timing at which it is predicted that the prediction value of the vehicle speed after a predetermined period of time is equal to or less than the lockup release speed. A time t3 of each of FIGS. 3 and 4 is a timing at which the vehicle speed becomes the lockup release speed or less.

In FIG. 3, although the fuel cut permission condition is established at the timing of time t2, since it is predicted that the prediction value of the vehicle speed after a predetermined period of time is equal to or less than the lockup release speed at the timing of time t2, the fuel cut is inhibited at time t2.

In FIG. 4, since, at the timing of time t2, the fuel cut permission condition is established and it is predicted that the prediction value of the vehicle speed after a predetermined period of time is larger than the lockup release speed, the fuel cut is permitted at the timing of time t2. That is, in FIG. 4, since it is predicted that lockup clutch 9 is not released immediately after time t2, the fuel cut starts at the timing of time t2.

Accordingly, as shown in FIG. 3, in internal combustion engine 1, it is possible to suppress a situation in which fuel supply is restarted (fuel cut recovery) immediately after the fuel supply has stopped (fuel cut). The vehicle can therefore suppress the occurrence of the torque fluctuation (driving force fluctuation) of internal combustion engine 1 resulting from the fuel cut recovery, a change in acceleration in the front-rear direction of the vehicle is suppressed, and a deterioration in driving performance can be suppressed.

In addition, in internal combustion engine 1, in case where the fuel supply is not restarted (fuel cut recovery) immediately after the stopping of the fuel supply (fuel cut), as shown in FIG. 4, the fuel cut becomes possible, and a deterioration in fuel consumption can be suppressed.

The vehicle speed after the predetermined period of time can be predicted (calculated) based on, for example, a change amount of the vehicle speed in a predetermined unit time.

The release of lockup clutch 9 is carried out with the lowering of the vehicle speed. Consequently, a phenomenon in which lockup clutch 9 is released in a short period of time after the fuel cut occurs easier as a deceleration amount (change amount) of the vehicle speed in a predetermined unit time becomes larger.

Therefore, by predicting (calculating) the vehicle speed after the predetermined period of time from the deceleration amount (change amount) of the vehicle speed, transmission controller 10 can accurately carry out the release of lockup clutch 9. Since the vehicle speed after the predetermined period of time is calculated based on the deceleration amount (change amount) of the vehicle speed, it can be predicted without being affected by the speed change ratio of the automatic transmission.

In the above-mentioned embodiment, the automatic transmission is a stepless transmission, and lockup clutch 9 can be released in accordance with a timing at which the vehicle speed becomes a lockup release speed or less, regardless of a timing at which the speed change ratio changes.

In case where the automatic transmission is a stepped automatic transmission, torque fluctuation due to the lockup clutch release is generally covered with a speed change shock by carrying out the release of lockup clutch 9 at a timing at which the speed change ratio changes.

However, in lockup clutch 9 of the above-mentioned embodiment, since the automatic transmission is continuously variable transmission 7, lockup clutch 9 can be released at a timing at which the vehicle speed becomes a lockup release speed or less, regardless of a timing at which the speed change ratio changes.

In addition, in the above-mentioned embodiment, since the automatic transmission is continuously variable transmission 7, the vehicle speed is not proportional to the engine rotation speed of internal combustion engine 1. Consequently, a control for releasing lockup clutch 9 in accordance with the vehicle speed is suitable for applying it to the vehicle on which continuously variable transmission 7 is mounted.

In addition, in the above-mentioned embodiment, in a situation in which it is predicted that lockup clutch 9 is released after elapse of the predetermined period of time and the fuel cut is inhibited, the gear ratio of speed change unit 2 is set to, for example, a lower side than the middle between the settable highest and lowest.

Figure 5:
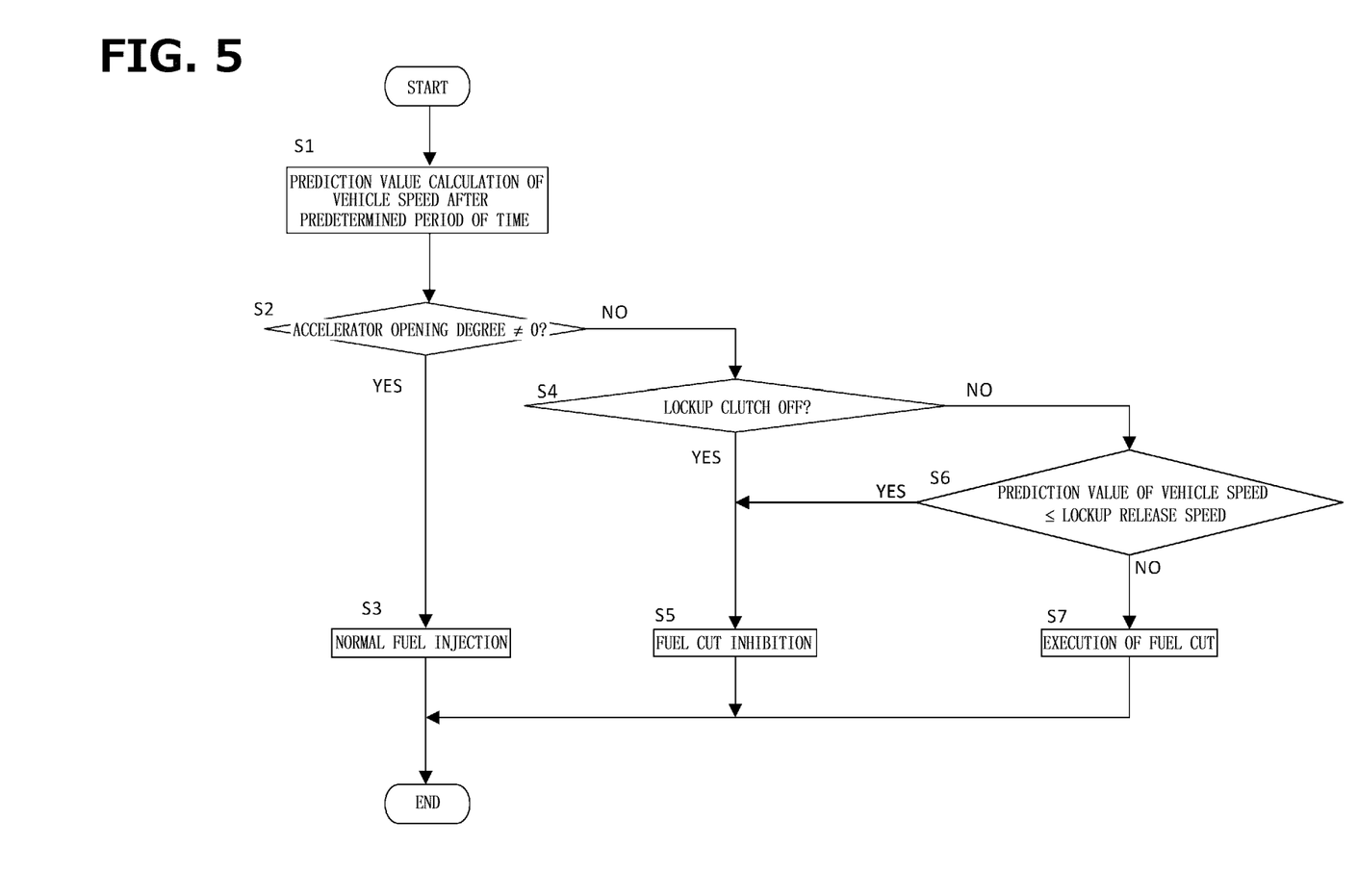
FIG. 5 is a flowchart showing one example of a flow of control for a vehicle to which the present invention has been applied.

FIG. 5 is a flowchart showing a flow of control for the vehicle in the above-mentioned embodiment. A step S1 is a step for calculating a prediction value of the vehicle speed after the predetermined period of time. A step S2 is a step for determining whether or not the accelerator opening degree is zero (accelerator is turned off). In case where it is determined that the accelerator opening degree is not zero (accelerator is not turned off) in step S2, the step is advanced to a step S3. In case where it is determined that the accelerator opening degree is zero (accelerator is turned off) in step S2, the step is advanced to a step S4. Step S3 is a step for carrying out normal fuel control in which normal fuel injection is carried out in accordance with a driving condition. Step S4 is a step for determining whether or not lockup clutch 9 is in an off state. In case where it is determined that lockup clutch 9 is in an off state in step S4, the step is advanced to a step S5. In case where it is determined that lockup clutch 9 is not in an off state in step S4, the step is advanced to a step S6. Step S5 is a step for inhibiting the fuel cut. Step S6 is a step for determining whether or not the prediction value of the vehicle speed is equal to or less than the lockup release speed. In case where it is determined that the prediction value of the vehicle speed is equal to or less than the lockup release speed in step S6, the step advanced to step S5. In case where it is determined that the prediction value of the vehicle speed is larger than the lockup release speed in step S6, the step is advanced to a step S7. Step S7 is a step for carrying out the fuel cut.

As the above, although a specific embodiment of the present invention has been explained, the present invention is not limited to the above-mentioned embodiment, and various changes might be made to the embodiment without departing from the scope and spirit of the present invention.

For example, when the vehicle speed after the predetermined period of time is predicted, it may be predicted by using a detection value of accelerator sensor 14.

The lockup release speed may be set higher as the gear ratio is lower.

The present invention can also be applied to one in which an automatic transmission is a stepped transmission.

The embodiment mentioned above relates to a vehicle control method and a vehicle control device.

The invention claimed is:

1. A method for controlling a vehicle in which an automatic transmission and a torque converter are provided on a path for transmitting a rotation of an internal combustion engine to a drive wheel, comprising:
   carrying out a fuel cut for stopping fuel supply to the internal combustion engine when a predetermined condition is established during traveling in a state in which a lockup clutch provided to the torque converter is engaged in an accelerator-off state in which an accelerator pedal is not stepped; and
   restarting the fuel supply to the internal combustion engine when the lockup clutch is released during the fuel cut,
   wherein, at a time of starting of the fuel cut, a vehicle speed after a predetermined period of time is predicted and when the predicted vehicle speed after the predetermined period of time is equal to or less than a lockup release speed for releasing the lockup clutch, the fuel cut is inhibited.

2. The method for controlling the vehicle according to claim 1, wherein, at the time of starting of the fuel cut, when it is predicted that the lockup clutch is released after elapse of a predetermined period of time, the fuel cut is inhibited, and the vehicle speed after the predetermined period of time is predicted and when the predicted vehicle speed after the predetermined period of time is equal to or less than the lockup release speed for releasing the lockup clutch, a gear ratio is set to a lower side than a middle between settable highest and lowest.

3. The method for controlling the vehicle according to claim 1, wherein, at the time of starting of the fuel cut, when it is predicted that the lockup clutch is released after elapse of a predetermined period of time, the fuel cut is inhibited, and the vehicle speed after the predetermined period of time is predicted and when the predicted vehicle speed after the predetermined period of time is equal to or less than the lockup release speed for releasing the lockup clutch, the lockup release speed is set higher as a gear ratio is lower.

4. The method for controlling the vehicle according to claim 1, wherein the automatic transmission is a stepless transmission.

5. A device for controlling a vehicle, comprising:
   an internal combustion engine as a driving source for a drive wheel of the vehicle;
   an automatic transmission and a torque converter provided on a path for transmitting a rotation of the internal combustion engine to the drive wheel;
   an accelerator opening degree detection part configured to detect a stepping amount of an accelerator pedal; and
   an engine controller configured to carry out a fuel cut for stopping fuel supply to the internal combustion engine when a predetermined condition is established during traveling in a state in which a lockup clutch provided to the torque converter is engaged in an accelerator-off state in which the accelerator pedal is not stepped, and restart the fuel supply to the internal combustion engine when the lockup clutch is released during the fuel cut, wherein the engine controller predicts a vehicle speed after a predetermined period of time and inhibits the fuel cut when the predicted vehicle speed after the predetermined period of time is equal to or less than a lockup release speed for releasing the lockup clutch, at a time of starting of the fuel cut.

* * * * *